Figure 1:
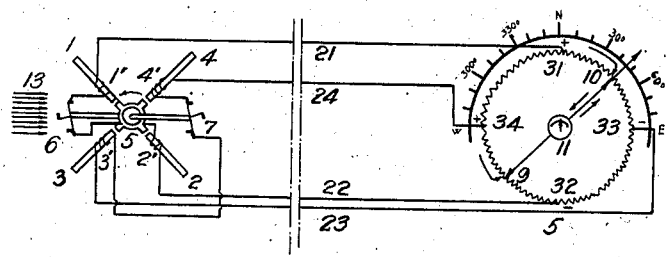

April 28, 1936.  U. GUERRA  2,038,787
EARTH INDUCTOR COMPASS
Filed Dec. 20, 1934

Inventor:
Ugo Guerra

Patented Apr. 28, 1936

2,038,787

UNITED STATES PATENT OFFICE 2,038,787

EARTH INDUCTOR COMPASS

Ugo Guerra, Rome, Italy

Application December 20, 1934, Serial No. 758,419
In Italy December 28, 1933

3 Claims. (Cl. 33—204)

My invention has reference to a device for finding the direction of the terrestrial magnetic field consisting essentially of an alternating current generator having stationary windings, the induction of which is provided by the terrestrial magnetic field. By a suitable arrangement of the electric circuits, the current produced allows to obtain at a distance the indications relative to the orientation of the place or of the vehicle containing the device, and also to determine the direction which the said vehicle must follow.

The variation of the induction which is necessary to generate the current is obtained by a periodic variation of the air gap between a certain number of cores made with magnetic material forming the inductors, having preferably a high permeability, disposed so as to face each other, and traversed more or less by the path of the earth's lines of force, according to their orientation in the magnetic field, and also provided with windings in which currents are induced due to the said variation of the magnetic flux; the indication of the direction is obtained by the method of reducing to naught the currents traversing the indicator, the control or the determination of the course being obtained by predisposing the course on a potentiometric device electrically and suitably connected both to the current generator and to the circuit of the indicator. In this latter element the current will vanish when the compass, which remains always fixed relatively to the axis of reference of the vehicle on which it is mounted, will have rotated, together with the vehicle, through an angle, relatively to the direction of the earth's magnetic field, such as to cause, with the currents induced in the windings, a resulting current which is naught at the terminals of utilization of the potentiometric device. Such arrangement has for its object the elimination of distance mechanical controls which are usually used in induction compasses, and the possibility of disposing the course control at any distance desired, and to render the control indications absolutely proportional to the angles of displacement of the compass in the earth magnetic field. Said arrangement has further for its object to cause the said indications to be absolutely independent of the frequency of variation of the induction, as the potentiometric control may be exclusively ohmic; to obtain a compass having a high sensitiveness, and to allow the use of an instrument having a high directing torque, it being possible to increase the number of the inductors as well as that of the windings as these latter are fixed; to balance magnetically in space the sensitive part of the compass, and lastly to obtain a complex, giving indications of the maximum possible precision, these indications not being subjected to be subsequently modified by any cause depending from the working or from the construction of the compass. This latter has in fact the electric circuits set continuously without interruptions, and rigidly connected, as there are no brushes, nor collectors, nor rotating windings.

The generating part of the current, being of the type of rotating ferromagnetic field, producing alternating currents, the indicator must therefore be electro-dynamical, but in order to improve the damping and to increase the sensitiveness of the compass, it is preferable to use instruments of the continuous current type by the unidirectional rendering of the current coming from the potentiometer device. In all the embodiments of the compass hereinafter described, the use of a continuous current instrument is mentioned, but it should be understood that an electro-dynamical instrument may be used indifferently, whenever the current is not made unidirectional, and the field of the same instrument is fed by an alternate current having a fixed phase and the same frequency.

Figure 5:
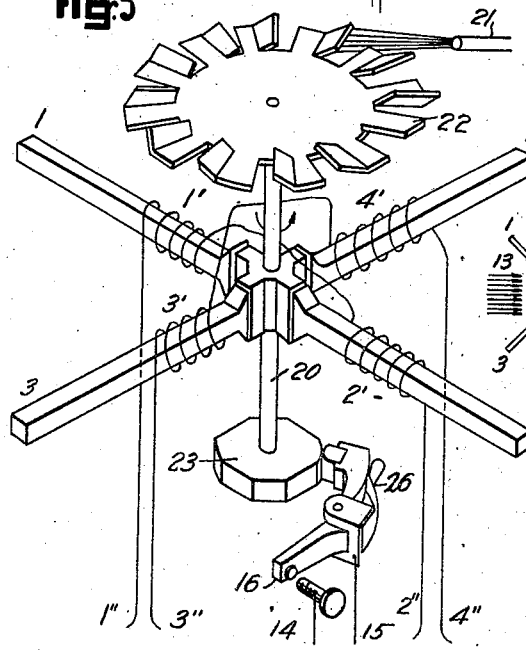

Figs. 1–4 of the accompanying drawing represent by way of example four different schematic circuit diagrams, suitable to realize the compass forming the object of the invention, while Fig. 5 shows a rotor system and a synchronous mechanical switch suitable as a circuit breaker.

In Fig. 1 showing the scheme of its elementary base,

1—2 and 3—4 indicate two pairs of inductors and rectilineal cores made of magnetic material, having preferably a high permeability, disposed at right angles to each other. 5 is a toothed rotor made of the same material, the rotation of which produces simultaneous and successive reductions and increases in the air gaps disposed between the inductors of the two pairs. 1', 2', 3' and 4', are single electric windings on the various inductors, disposed either in series or in derivation between them, relative to the windings of each pair of cores; 21, 22 are the terminals of the circuit formed by two windings of the pair of inductors 1, 2; and 23, 24 are the terminals of the circuit formed by the windings of the pair of inductors 3 and 4. An annular closed winding having a suitable ohmic resistance or impedance, is fed at four diametrically opposite points 31, 32, 33, and 34, by two circuits 21, 22, and 23, 24, in the way indicated in Fig. 1, so that the four portions:

31—33; 33—32; 32—34; and 34—31, may be exactly equal to each other both geometrically and electrically. 9 and 10 are two slides which are diametrically opposite and integral one with the other, these slides being adapted to move along and in contact with an edge of the annular winding 8. 11 indicates a continuous current instrument having its zero mark disposed on its centre, connecting electrically the two slides 9 and 10 with each other.

In this arrangement, if 13 represents the direction of the horizontal component of the earth magnetic field, disposed by way of example in a direction parallel to the bisector of the angle formed by the two pairs of inductors 1—2 and 3—4, said inductors will be traversed equally by the flux, so that the rotation of the toothed rotor 5, which produces an equal variation of reluctance in the two pairs of inductors, will generate, in the windings 1′, 2′ and 3′, 4′, alternate currents of equal amplitude. If at any point of the two circuits 21—22 and 23—24, two synchronous rotating switches 6 and 7 are inserted with the rotor 5, so as to allow the passage of a single alternation of the current, the said two circuits will be traversed by two unidirectional currents having the same amplitude. To the four terminals of the potentiometric circuit 8, will be applied consequently two equal electromotive and unidirectional forces, and consequently it will readily be seen that, due to the polarities as shown by way of example in Fig. 1, there is only one diametrical position of the pair of slides 9 and 10, in which the resultant effect of the currents traversing the indicator 11, and particularly the position indicated in said figure, viz., 45° between the diameters 31, 32 and 33, 34, is reduced to zero. Any other position of the slides, which does not differ 180° from the first, will cause the deviation of the indicator in either direction, the maximum deviation being reached in the position of 90° from that in consideration; the indicator will however be equally deviated if the two pairs of inductors of the generating portion will shift from the position indicated relative to the earth magnetic field, as in such case the balance of the currents in the potentiometric circuit becomes broken. It will also be seen that, if it is desired, for example, to follow a direction at an angle of 45° from the direction considered, it will be necessary, for example, to place the pair of slides 9 and 10 on the diameter 33—34, and rotate the generating part also through an angle of 45°, in order to obtain a resultant current which is nil on the indicator 11; which means that the pair of inductors 3 and 4 will have to dispose itself normally to the direction of the earth magnetic field to obtain that the E. M. F. becomes nil on the respective windings.

The above considerations may be extended to all the possible positions of the diametrical pair of slides 9 and 10 inside the potentiometric ring 8, and consequently to all directions; it follows from this, that to any angular displacement of the slides, there is a corresponding similar angular displacement that must be imparted to the compass in order to reduce to naught the resulting current inside the indicator instrument. If the pair of slides carries an index finger movable on a dial 12 graduated as a compass rose, the predetermined direction may be fixed directly on said graduated dial. There is a direct linear relation between the angles of displacement of the pair of slides and the corresponding angles of the compass, which give no current in the indicator.

By a suitable proportioning of the windings 1′, 2′, 3′, and 4′, and the resistance or impedance of the potentiometric winding 8, the distance between this latter and the compass may be selected as desired.

Figure 2:
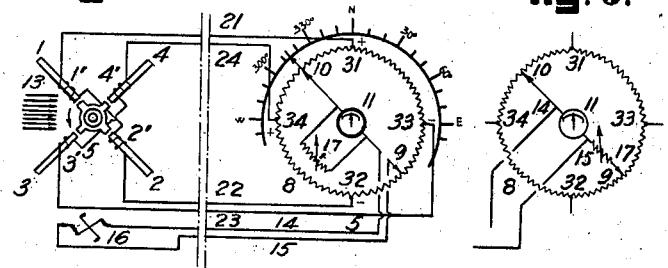

Fig. 2 shows a simplified arrangement in which the two rotating switches 6 and 7 shown in Fig. 1 are reduced to a single rotating switch 16, which is no longer inserted on the winding circuits, but is inserted in the circuit of the slides 9 and 10 and the indicator 11. It is obvious, in fact, that it is sufficient that only the indicator instrument be traversed by an unidirectional current. This arrangement is preferable to the one first described, both because the principal circuits are all traversed by alternating current, the characteristics of which may be varied by means of suitable transformers, and also because the presence of a single rectifying member renders impossible any unbalancing of current in the circuits through any cause other than the displacement of slides 9 and 10, or the displacement of the generating portion. In the arrangement shown in Fig. 2 is also included a resistance 17, which, being arranged in parallel to the indicator instrument, allows to increase its damping and to vary its sensitiveness.

Figure 3:
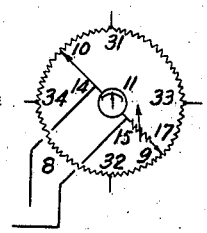

A modification of the arrangement just described is shown in Fig. 3, which shows the rotating switch disposed in parallel, instead of in series, with the indicator, and the resistance for the variation of the sensitiveness is disposed in series, instead of in parallel, the whole giving similar results.

All the arrangements above described require the use of synchronous rotating or vibrating switches, because, for the purpose of permitting the indications of displacements from the course in the two directions, it is necessary that the current, although unidirectional, may traverse the circuit of the instrument indifferently in either direction, which is the feature of all mechanical switches.

Figure 4:
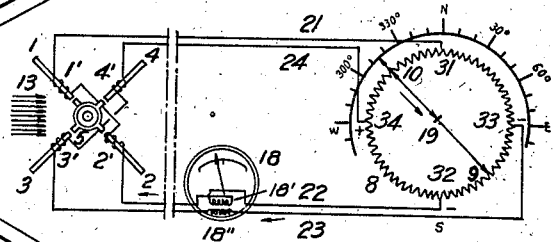

A different arrangement, providing the use of a single fixed rectifier, instead of a mechanical one, for example a metallic oxide rectifier, a diode and the like, is shown by way of example in Fig. 4, which shows that in the circuit of the slides 9 and 10, a fixed rectifier 19 is inserted instead of the indicator. This rectifier, which is of the differential type with continuous current, for instance with crossed coils 18′ and 18″, is inserted in both circuits of the two pairs of windings, for example, in the way shown in Fig. 4; it will be seen that, while the instrument is always traversed by alternate currents having no effect, with regard to the continuous current, the resultant effect will be naught only for a single diametrical position of the slides 9 and 10 of the ring 8. This applies, of course, for a given position in space, in the direction of the two pairs of inductors 1—2 and 3—4.

In all the arrangements shown by way of example, it is convenient that the number of the teeth of the rotor should be even, or a multiple of the number of the inductors, and that the interruption frequency of the mechanical interrupters should be equal to the frequency of the alternations created in the inductors' windings.

In the arrangements above described it appears obvious that the inductors may be provided in any desired number. In fact, by the use of three inductors, instead of four as shown by way of example in Fig. 2, and by the symmetrical placing of the three inductors, viz. at 120° between them, the generating portion will operate as a three-phase alternator, instead of a two-phase alternator, and it will be sufficient therefore to connect the three windings of the inductors as a star or triangle connection, and to apply the corresponding circuit at three equidistant points of the potentiometric ring 8, in order that the complex may function exactly as described in the arrangement comprising four inductors. Thus these latter may also be more than four, and it will be sufficient to provide the potentiometric ring with an equal number of feed points in order that the operation of the device may be similar to that above described.

As shown in Fig. 5, the rotor and the synchronous mechanical switch may be mounted on the same axis, the device being rotated by any convenient means desired. According to Fig. 5, the shaft 20 carrying the rotor is rotated by an air jet 21 playing against the peripheral blades 22 of a disk secured to the upper end of the shaft. On its lower end, the shaft 20 carries a polygonal cam 23, which, upon the rotation of the shaft, causes in rapid succession the opening and closing of the electrical contact 16, which is continuously pressed against the cam 23 by a spring 26.—This device requires only a very small amount of energy for imparting movement to said parts and maintaining said movements.

I claim as my invention:

1. In a variable induction compass for determining the direction of the terrestrial magnetic field, an alternating current generator comprising a plurality of fixed inductors having windings thereon forming circuits and a rotatable iron core cooperating with said inductors for generating alternating currents in said windings, an annular closed winding fed by said circuits at geometrically and electrically equidistant points corresponding in number to said windings or a multiple thereof, a pair of rigidly connected slides disposed diametrically opposite to each other and adapted to slide in contact with said annular winding for angular displacement, and an indicator electrically connected with said slides and normally indicating the zero position.

2. The combination as specified in claim 1, including synchronous rotating switches operatively associated with said rotor and included in said circuits causing two unidirectional currents having the same amplitude to traverse said circuits.

3. The combination as specified in claim 1, including a rectifier in said circuits for rendering the alternating current produced by the generator unidirectional.

UGO GUERRA.